(12) United States Patent
Lee

(10) Patent No.: US 10,179,347 B2
(45) Date of Patent: Jan. 15, 2019

(54) VIBRATION GENERATING DEVICE

(71) Applicant: Gyung Woon Lee, Incheon (KR)

(72) Inventor: Gyung Woon Lee, Incheon (KR)

(*) Notice: Subject to any disclaimer, the term of this patent is extended or adjusted under 35 U.S.C. 154(b) by 297 days.

(21) Appl. No.: 14/911,196

(22) PCT Filed: Aug. 7, 2014

(86) PCT No.: PCT/KR2014/007313
§ 371 (c)(1),
(2) Date: Feb. 9, 2016

(87) PCT Pub. No.: WO2015/020450
PCT Pub. Date: Feb. 12, 2015

(65) Prior Publication Data
US 2016/0184864 A1    Jun. 30, 2016

(30) Foreign Application Priority Data
Aug. 9, 2013  (KR) .................. 10-2013-0094722

(51) Int. Cl.
*B06B 1/18* (2006.01)
*F15B 15/02* (2006.01)
*F16H 57/01* (2012.01)

(52) U.S. Cl.
CPC .............. *B06B 1/183* (2013.01); *F15B 15/02* (2013.01); *F16H 57/01* (2013.01)

(58) Field of Classification Search
CPC ........... B06B 1/183; F15B 15/02; F16H 57/01
(Continued)

(56) References Cited

U.S. PATENT DOCUMENTS 4,026,193 A * 5/1977 Olmsted ................. B06B 1/183
137/596.14
5,070,769 A * 12/1991 Fehr ....................... B06B 1/161
91/232

(Continued)

FOREIGN PATENT DOCUMENTS

| EP | 0315416 | 5/1989 |
|----|---------|--------|
| JP | 7030138 | 7/1995 |
| JP | 2599602 | 4/1997 |
| JP | 3699306 | 9/2005 |

OTHER PUBLICATIONS

JP 3699306—English Translation (Morito, Yoshio. retrieved from https://www4.j-platpat.inpit.go.jp on Feb. 5, 2018. Applicant provided original language version).*

(Continued)

*Primary Examiner* — Dwayne J White
*Assistant Examiner* — Richard Drake
(74) *Attorney, Agent, or Firm* — Davidson, Davidson & Kappel, LLC

(57) ABSTRACT

The present invention relates to a vibration generator, an more particularly to a technology in which an actuating shaft protrudes from the opposite ends of a housing such that vibrations generated from the actuating shaft are alternately output in opposite directions of the housing so as to improve vibration efficiency and such that a single vibration generator simultaneously applies the vibrations to a plurality of external objects so as to additionally enhance an economic effect. Furthermore, the present invention relates to a technology in which an actuating shaft protrudes from the opposite ends of a housing, thereby enabling stable installation. In addition, the present invention relates to a technology in which a fluid supply tube is configured to be movable in the axial direction of an actuating shaft so as to prevent breakage of the connected portion of the fluid supply (Continued)

tube, which might otherwise occur during the operation of the vibration generator.

5 Claims, 9 Drawing Sheets

(58) Field of Classification Search
USPC .......................................................... 91/232
See application file for complete search history.

(56) References Cited

U.S. PATENT DOCUMENTS

| | | | | |
|---|---|---|---|---|
| 5,154,567 A * | 10/1992 | Baker | ...................... | B06B 1/183 |
| | | | | 73/12.04 |
| 7,810,618 B2 * | 10/2010 | Weber | ...................... | B06B 1/183 |
| | | | | 188/316 |
| 7,997,184 B2 * | 8/2011 | Hansen | ................... | B06B 1/183 |
| | | | | 73/665 |
| 9,394,789 B2 * | 7/2016 | Fedeli | ....................... | B06B 1/18 |

OTHER PUBLICATIONS

International Search Report issued in corresponding International Application No. PCT/KR2014/007313, dated Nov. 7, 2014.
International Preliminary Report on Patentability issued in corresponding International Application No. PCT/KR2014/007313, dated Aug. 7, 2014.

* cited by examiner

VIBRATION GENERATING DEVICE

This application is a U.S. national phase application under 35 U.S.C. § 371 of International Application No. PCT/KR2014/007313, filed Aug. 7, 2014, which claims priority to Korean Patent Application No. 10-2013-0094722, filed Aug. 9, 2013; the disclosures of which are all hereby incorporated by reference herein.

TECHNICAL FIELD

The present invention relates to a vibration generator in which an actuating shaft disposed in a housing is able to apply vibrations to external objects connected to the actuating shaft while repeatedly moving in an alternating manner due to fluid pressure, and more particularly to a vibration generator in which vibrations caused by the actuating shaft are simultaneously generated in opposite directions of the housing in order to improve vibration-generating efficiency, and in which the structure for introducing and discharging fluid and the internal flow path of fluid are improved in order to enable stable installation.

BACKGROUND ART

In general, a vibration generator includes an actuating shaft, a partial section of which is longitudinally disposed in a housing and which is exposed at opposite sections thereof to the outside, the ends of the exposed sections of the actuating shaft being connected to external objects such as hoppers, pipes or the like.

When fluid such as compressed air is supplied to the inside of the housing from the outside, the housing collides with an actuating shaft while repeatedly moving in a reciprocating manner due to the structure of an internal fluid flow path, thereby repeatedly transmitting vibrations to the external objects.

Conventional vibration generators are constructed such that only one end of an actuating shaft protrudes from a housing and is connected to an external object, that is, such that the entire vibration generator is suspended from the external object via the one end of the actuating shaft.

Such a structure, in which the whole vibration generator is connected to an external object via only one end of the actuation shaft, is subjected to a bending moment due to gravity acting on the portion other than the connected portion thereof if the vibration generator is connected to the external object while being horizontally oriented.

When this condition is maintained for a long time, the actuating shaft may be deformed or broken, thereby shortening the service life. Furthermore, since the bending moment is concentrated on the portion of the actuating shaft that is connected to the external object, it is difficult to implement a reliable connection to the external object.

In addition, since the conventional vibration generator is constructed such that only one end of the actuating shaft protrudes and is connected to an external object, as described above, it is inevitable that the vibration generated from the vibration generator is output only in one direction, thereby making it difficult to transmit the vibration to external objects other than the one external object.

Accordingly, respective vibration generators have to be connected to external objects in accordance with respective work environments, thereby resulting in economic loss.

In addition to the problem with the connecting structure between the actuating shaft and an external object, the conventional vibration generator, in which the end of an external fluid supply tube is connected to a housing so as to allow external fluid to be supplied through a supply hole formed in the housing, has the following problems.

In the connection of the fluid supply tube to the housing, there is no other choice but to connect the fluid supply tube in the direction perpendicular to the longitudinal moving direction of the housing. Therefore, since the load generated during the longitudinal movement of the housing is concentrated on the connected portion between the fluid supply tube and the housing, there is a great risk of breakage of the connected portion.

DISCLOSURE

Technical Problem

Therefore, the present invention has been made in view of the above problems, and it is an object of the present invention to provide a vibration generator in which an actuating shaft protrudes from opposite ends of a housing such that vibrations generated from the actuating shaft are alternately output in opposite directions of the housing so as to improve vibration efficiency and to enable a single vibration generator to simultaneously apply vibrations to a plurality of external objects so as to additionally enhance the economic effect.

Another object of the present invention is to provide a vibration generator in which an actuating shaft protrudes from opposite ends of a housing, thereby enabling stable installation.

Still another object of the present invention is to provide a vibration generator in which a fluid supply tube is configured to be movable in the axial direction of an actuating shaft so as to prevent breakage of the connected portion of the fluid supply tube which might otherwise occur during the operation of the vibration generator.

Technical Solution

In order to achieve the above objects, the present invention provides a vibration generator including a housing, which includes a pressure-creating space defined therein, first and second shaft moving paths communicating with opposite ends of the pressure-creating space and an outside, a fluid supply path connecting one end of the pressure-creating space to the outside, and a fluid discharge path connecting the other end of the pressure-creating path to the outside, and an actuating shaft, which sequentially extends through the first shaft moving path, the pressure-creating space and the second shaft moving path and protrudes outward at opposite ends thereof from opposite ends of the housing, and which includes a fluid contact block which is disposed in the pressure-creating space between a point connected to the fluid supply path and a point connected to the fluid discharge path.

The pressure-creating space may include a first pressure-creating space, positioned at one side of the fluid contact block, and a second pressure-creating space, positioned at the opposite side of the fluid contact block, wherein the fluid contact block may be movable between the first and second pressure-creating spaces, wherein the fluid supply path may be connected to the first pressure-creating space, and wherein the fluid discharge path may be connected to the second pressure-creating space.

The actuating shaft may include a fluid introduction path, which is longitudinally formed in one end of the actuating shaft that is located closer to the first pressure-creating space with respect to the fluid contact block, one end of the fluid introduction path being connected to the fluid supply path, and a fluid recovery path, which is longitudinally formed therein from a point, at which the first pressure-creating space is positioned with respect to the fluid contact block, to the other end of the actuating shaft, the fluid recovery path being connected to or disconnected from the fluid discharge path in response to movement of the actuating shaft.

A diameter of a zone of the actuating shaft that is positioned in the first pressure-creating space may be less than that of a zone of the actuating that is positioned in the second pressure-creating space.

The vibration generator may further include buffer members, which are positioned between opposite ends of the fluid contact block and inner surfaces of the pressure-creating space.

The vibration generator may further include buffer members, which are mounted on opposite ends of the actuating shaft.

Advantageous Effects

According to the present invention, which may be embodied in these manners, fluid pressure is generated at both ends of the actuating shaft by the transfer of fluid in the pressure-creating space so as to repeatedly move the actuating shaft or the housing in an alternating manner, thereby causing vibrations to be alternately output from the actuating shaft in opposite directions.

Accordingly, two vibrations can be generated during a single cycle of fluid supply and discharge, thereby doubling the number of vibrations generated compared to a conventional technology.

When the opposite ends of the actuating shaft are connected to respective external objects, it is possible to simultaneously apply vibrations to a plurality of external objects using a single vibration generator.

Furthermore, since the opposite ends of the actuating shaft, which protrude from the opposite ends of the housing, may be connected to respective external objects, the load applied to the actuating shaft may be minimized, thereby minimizing breakage or the like of the actuating shaft, unlike a conventional technology, in which only one end of an actuating shaft is connected to an external object.

In addition, since a fluid supply path is oriented in the axial direction of the actuating shaft and an external fluid supply tube is connected to the end of the actuating shaft, it is possible to solve the problem whereby a load generated during the longitudinal movement of the housing, is concentrated on the connected portion of the fluid supply tube, thereby causing the connected portion to break.

Furthermore, since buffer members are provided in the housing or at the ends of the actuating shaft, it is possible to minimize impacts generated at the time of collisions between the housing and the actuating shaft, thus extending the service life of the vibration generator.

DESCRIPTION OF DRAWINGS

FIGS. 1 to 7 are views showing a first embodiment of the present invention, in which
FIG. 1 is an overall exploded perspective view,
FIG. 2 is an assembled perspective view,
FIG. 3 is a cross-sectional perspective view of FIG. 2,
FIG. 4 is a cross-sectional view of FIG. 3,
FIG. 5 is a cross-sectional view showing the state in which an actuating shaft is moved toward a second pressure-creating space by the initial introduction of fluid,
FIG. 6 is a cross-sectional view showing the state in which the fluid is introduced into the second pressure-creating space from the state of FIG. 5,
and
FIG. 7 is a cross-sectional view showing the state in which the actuating shaft is moved toward the first pressure-creating space by an increase in pressure in the second pressure-creating space.

BEST MODE

Figure 1:
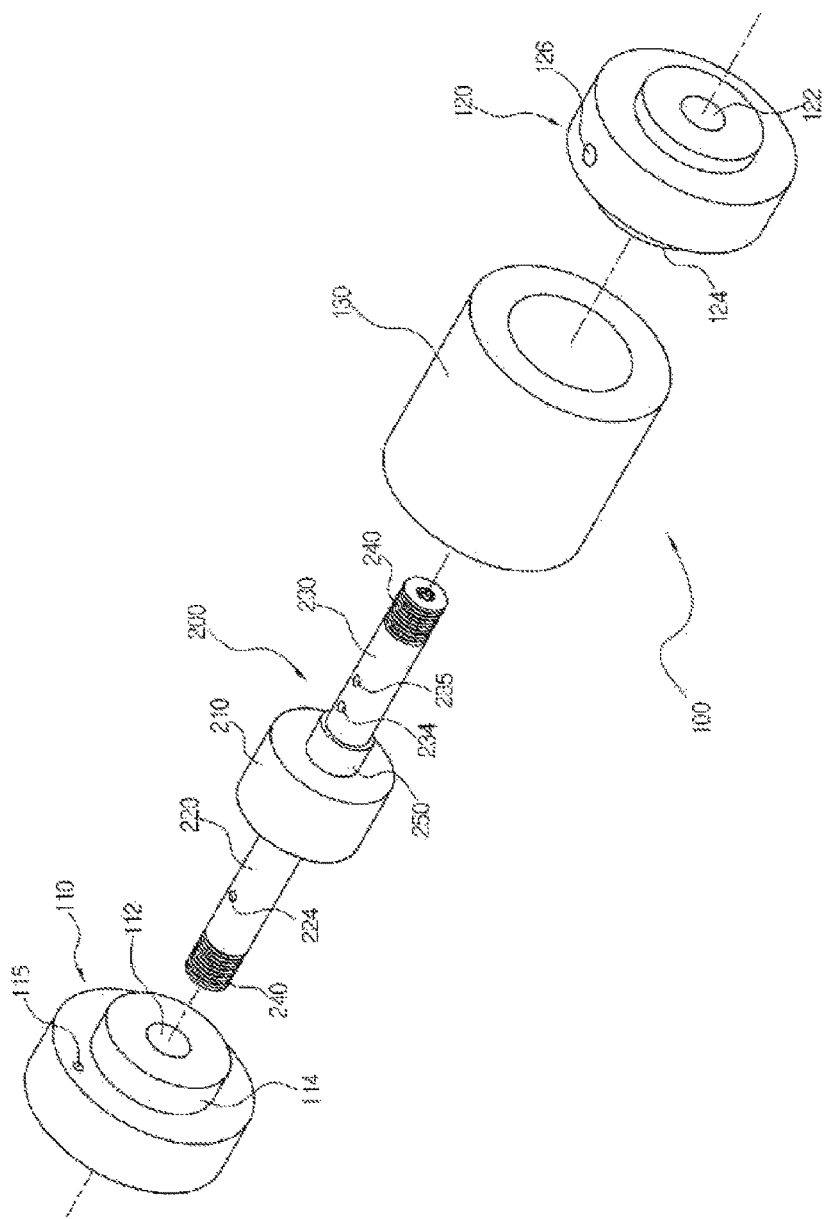
Figure 2:
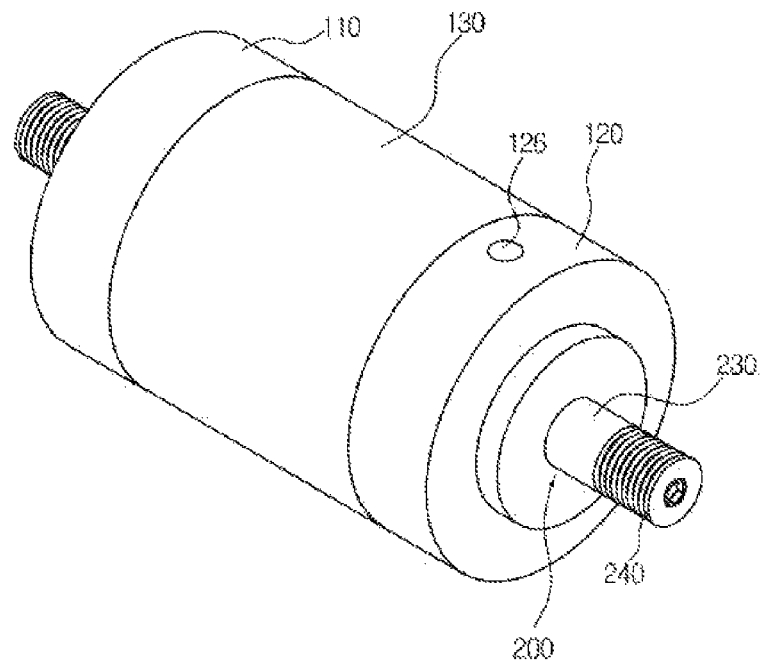
Figure 3:
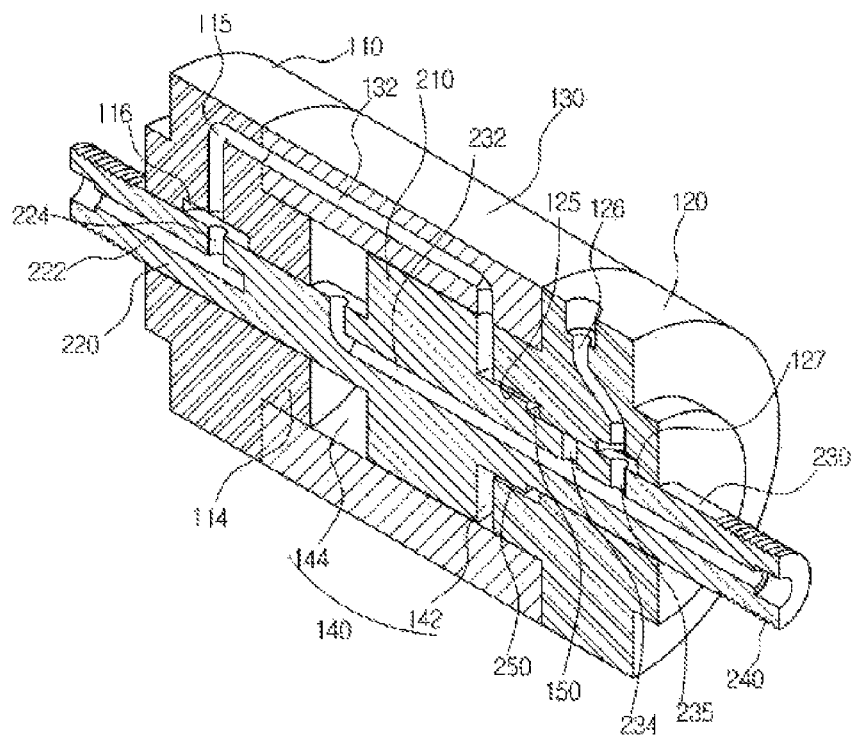

Hereinafter, the specific construction of the present invention and the effect obtained therefrom will be described with reference to embodiments shown in the accompanying drawings.

For reference, the term "fluid" used herein means all of air, water, oil and the like. In other words, various fluids may be selected and supplied to a housing.

As shown in FIGS. 1 to 4, the vibration generator according to the present invention includes a housing 100 and an actuating shaft 200.

The housing 100, which serves as the overall casing and functions to define the transfer path for fluid and to generate a vibration depending on the installed state, is configured to have a hollow pipe as a whole, and is provided at an intermediate portion thereof with a pressure-creating space 140 having a predetermined volume.

The housing 100 is also provided at opposite sides with respect to the pressure-creating space 140 with a shaft moving path for guiding the linear movement of the actuating shaft 200, which will be described later. The shaft moving path has almost the same diameter as the actuating shaft 200, and extends through opposite ends of the housing 100 such that it communicates with the pressure-creating space 140.

The housing 100 is configured so as to have an assembly structure capable of being dismantled for the mounting of the actuating shaft 200. To this end, the housing 100 is divided into a first body 110, a second body 120 and a connecting pipe 130.

Among these components, the first body 110, which serves as both one side cap of the housing 100 and a coupler for a segment of the actuating shaft 200 that is positioned at one side with respect to the center of the actuating shaft 200, is configured to have the shape of a cylindrical block through the center of which a first shaft moving path 112 extends.

The first body 110 is provided on the inner side thereof with a first stepped portion 114, which has a smaller diameter than the external diameter of the first body 110.

The first shaft moving path 112 formed in the first body 110 is connected at the center point thereof to an end of a fluid supply path 115. The other end of the first fluid supply path 115 terminates at a point on the inner side of the first body 110 above the first stepped portion 114.

The end of the first fluid supply path 115 that is connected to the first shaft moving path 112 is provided with a first connection guide groove 116, which is longer than the remaining portion of the first fluid supply path 115 in the longitudinal direction, such that an end of a fluid introduction path 222 of the actuating shaft 200 always communicates with the first fluid supply path 115 while the actuating shaft 200 moves longitudinally.

The second body 120, which constitutes the housing 100 together with the first body 110, serves as both the opposite side cap of the housing 100 and a coupler for a segment of the actuating shaft 200 that is positioned at the opposite side with respect to the center of the actuating shaft 200, and is configured to have a cylindrical block shape through which a second shaft moving path 122 centrally extends, like the first body 110.

The second body 120 is provided on the inner side thereof with a second stepped portion 124, the diameter of which is smaller than the external diameter of the second body 120.

The second body 120 is configured so as to be symmetrical to the first body 110 in the longitudinal direction and to face the first body 110 with a space therebetween, whereby the second shaft moving path 122 is aligned with the first shaft moving path 112 of the first body 110.

The second shaft moving path 122 is provided at a region thereof corresponding to the second stepped portion 124 with a cross-section reduction recess 125, which has a relatively large diameter.

The second shaft moving path 122 of the second body 120 communicates at the center point thereof with one end of a fluid discharge path 126. The other end of the fluid discharge path 126 extends to the outer surface of the second body 120.

The end of the fluid discharge path 126 that communicates with the second shaft moving path 122 is provided with a second connection guide groove 127 such that a second fluid discharge hole 235 accurately communicates with the fluid discharge path 126 even when they are misaligned with each other while the actuating shaft 200 moves longitudinally.

The connecting pipe 130, which constitutes the housing 100 together with the first body 110 and the second body 120, serves to connect the first body 110 to the second body 120 and to define the pressure-creating space 140 between the first body 110 and the second body 120. The connecting pipe 130, which is configured to have a hollow pipe shape, has an internal diameter equal to the external diameter of the first and second stepped portions 114 and 124 of the first and second bodies 110 and 120 and an external diameter equal to the external diameter of the first and second bodies 110 and 120.

For reference, the external diameter of the connecting pipe 130 does not necessarily need to be equal to the external diameter of the first and second bodies 110 and 120, and may be less than the external diameter of the first and second bodies 110 and 120.

The connecting pipe 130 is disposed between the first body 110 and the second body 120, and the first and second stepped portions 114 and 124 of the first and second bodies 110 and 120 are fitted into the opposite ends of the connecting pipe 130, whereby the connecting pipe 130 completely surrounds the space between the first and second bodies 110 and 120.

Accordingly, the space of the housing 100 that is defined between the first body 110 and the second body 120 is surrounded by the connecting pipe 130 so as to define the pressure-creating space 140 required for longitudinal movement of the actuating shaft 20

The connecting pipe 130 is provided in a wall thereof with a second fluid supply path 132 such that one end of the second fluid supply path 132 extends to the end of the connecting pipe 130 that faces the first body 110 and communicates with the first fluid supply path 115 of the first body 110 and the other end of the second fluid supply path 132 communicates with the pressure-creating space 140 in the housing 100 directly in front of the second stepped portion 124 of the second body 120.

For reference, the housing 100 is not limited to the configuration composed of the first body 110, the second body 120 and the connecting pipe 130, and may be variously modified into a configuration in which the connecting pipe 130 is integrally formed with the first body 110 or the second body, as long as it is assured that the actuating shaft 200 can be easily installed and can be moved longitudinally.

The actuating shaft 200 is fitted into the housing, which has been described above.

The actuating shaft 200, which receives the fluid pressure supplied to the inside of the housing 100 and generates a vibration, is configured to have a rod shape having a greater length than the housing 100, and is provided at the center thereof with a fluid contact block 210, which is configured to have a flange shape having a relatively great diameter.

The fluid contact block 210 is provided at one side thereof with a first straight rod 220 protruding therefrom, and is provided at the other side thereof with a second straight rod 230 protruding therefrom in a symmetrical manner.

The free end of the first straight rod 220 and the free end of the second straight rod 230 are provided with respective threaded sections 240, which are to be connected to an external object 1 or a buffer member.

For reference, the connection structure between the actuating shaft 200 and an external object or a buffer member may be embodied by various structures other than the threaded section 240.

The actuating shaft 200 sequentially extends through the first shaft moving path 112, the pressure-creating space 140 and the second shaft moving path 122 of the housing 100. The first straight rod 220 extends through the first shaft moving path 112 in the housing 100, and protrudes outward at one end thereof from the first body 110, and the second straight rod 230 extends through the second moving path 122 in the second body 120, and protrudes outward at one end thereof from the second body 120. The fluid contact block 210 is disposed in the pressure-creating space 140 in the housing 100.

The diameter of the fluid contact block 210 is equal to the diameter of the pressure-creating space 140, that is, the internal diameter of the connecting pipe 130, and the longitudinal width of the fluid contact block 210 is slightly less than the longitudinal width of the pressure-creating space 140.

Accordingly, the pressure-creating space 140 is divided into two spaces, with the fluid contact block 210 disposed therebetween. In other words, a first pressure-creating space 142 is defined adjacent to the second body 120, and a second pressure-creating space 144 is defined adjacent to the first body 110, whereby the first pressure-creating space 142 and the second pressure-creating space 144 are defined independently of each other.

By virtue of the structure, the opposite ends of the actuating shaft 200 protrude from the opposite end of the housing 100, and may be moved linearly in the longitudinal direction within the pressure-creating space 140.

The section of the second straight rod 230 that is positioned in the first pressure-creating space 142 is provided therearound with an insertion portion 250, which is fitted into the cross-section reduction recess 125 in the second body 120. The external diameter of the insertion portion 250 is less than the diameter of the cross-section reduction recess 125, and the length of the insertion portion 250 is shorter than the length of the cross-section reduction recess 125. Consequently, when the insertion portion 250 is inserted into the cross-section reduction recess 125 during the longitudinal movement of the actuating shaft 200, a fluid discharge gap 150 is defined between the cross-section reduction recess 125 and the insertion portion 250.

By virtue of the provision of the insertion portion 250, the zone of the second straight rod 230 that is positioned in the first pressure-creating space 142 has a smaller cross-sectional area that the section of the first straight rod 220 that is positioned in the second pressure-creating space 144. This means that the contact area between the first straight rod 220 and the fluid in the pressure-creating space 140 is larger than the contact area between the second straight rod 230 and the fluid in the pressure-creating space 140.

The first straight rod 220 of the actuating shaft 200 is provided therein with a fluid introduction path 222, which extends longitudinally from the end of the first straight rod 220 to a point before the second pressure-creating space 144. The end of the fluid introduction path 222 communicates with the first connection guide groove 116 in the first body 110 through a fluid connection path 224, whereby the fluid introduction path 222 of the actuating shaft 200 communicates with the first fluid supply path 115 of the housing 100.

The longitudinal length of the first connection guide groove 116 in the first body 110 is set to be greater than the longitudinal moving distance of the fluid contact block 210 in the pressure-creating space 140 such that the fluid connection path 224 of the actuating shaft 200 is always positioned within the first connection guide groove 116, thereby ensuring the efficient supply of fluid.

The second straight rod 230 is provided therein with a fluid recovery path 232, which extends through the fluid contact block 210 from the end of the second straight rod 230 to a point of the second straight rod 230 that is positioned within the second pressure-creating space 144, and which communicates with the second pressure-creating space 144.

Figure 4:
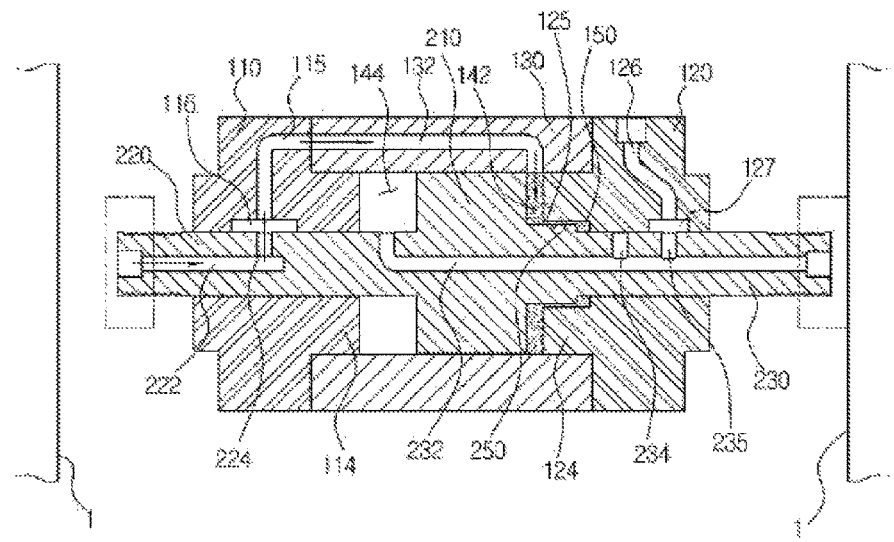

The fluid recovery path 232 in the second straight rod 230 is provided with a first fluid discharge hole 234 and with the second fluid discharge hole 235 with a space therebetween. The spacing between the first fluid discharge hole 234 and the second fluid discharge hole 235 is set such that the second fluid discharge hole 235 communicates with the second connection guide groove 127 in the second body 120 and such that the first fluid discharge hole 234 is located between the cross-section reduction recess 125 and the second connection guide groove 127 when the fluid contact block 210 is moved toward the first pressure-creating space 142, as shown in FIG. 4.

Figure 6:
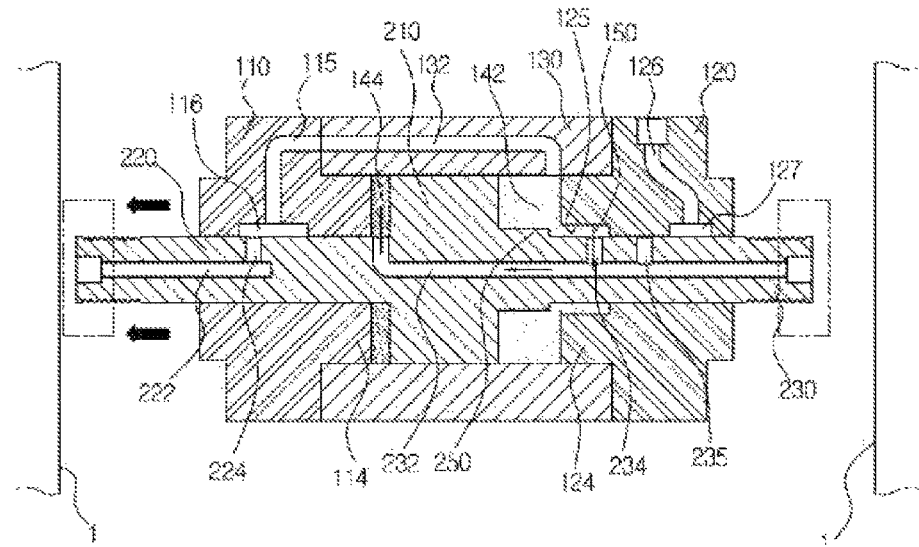

Meanwhile, when the fluid contact block 210 is moved toward the second pressure-creating space 144, as shown in FIG. 6, the first fluid discharge hole 234 is moved so as to communicate with the fluid discharge gap 150, and the second fluid discharge hole 235 is located between the fluid discharge gap 150 and the second connection guide groove 127, thereby blocking the communication with the fluid discharge path 126.

For reference, the fluid recovery path 232 is illustrated in the drawing as being formed from the end of the second straight rod 230. The reason for this is because the fluid recovery path 232 inevitably has to be machined in the second straight rod 230. Hence, the end of the fluid recovery path 232 is plugged by an additional set screw.

Accordingly, the fluid recovery path 232 does not need to extend to the end of the second straight bar 230, and may extend to the second fluid discharge hole 235.

Hereinafter, operation of the embodiment and the unique effects obtained through the operation will be described.

The operation of generating a vibration by longitudinal movement of the actuating shaft 200 while the housing 100 is secured to a separate structure will now be described.

The end of an external fluid supply tube (not shown) is first connected to the inlet of the fluid introduction path 222 formed in the first straight rod 220 in order to supply external fluid to the inside of the housing 100. At this point, the fluid supply tube is oriented such that the longitudinal direction of the fluid supply tube is aligned with the longitudinal direction of the first straight rod 220.

For reference, the following description will be made based on the state in which the fluid contact block 210 of the actuating shaft 200 is moved toward the first pressure-creating space 142 in the pressure-creating space 140, as shown in FIG. 4.

In this state, when fluid, such as compressed air, is introduced into the fluid introduction path 222, the fluid flows into the first pressure-creating space 142 through the fluid connection path 224, the first fluid supply path 115 of the first body 110 and the second fluid supply path 132 of the connecting pipe 130.

Figure 5:
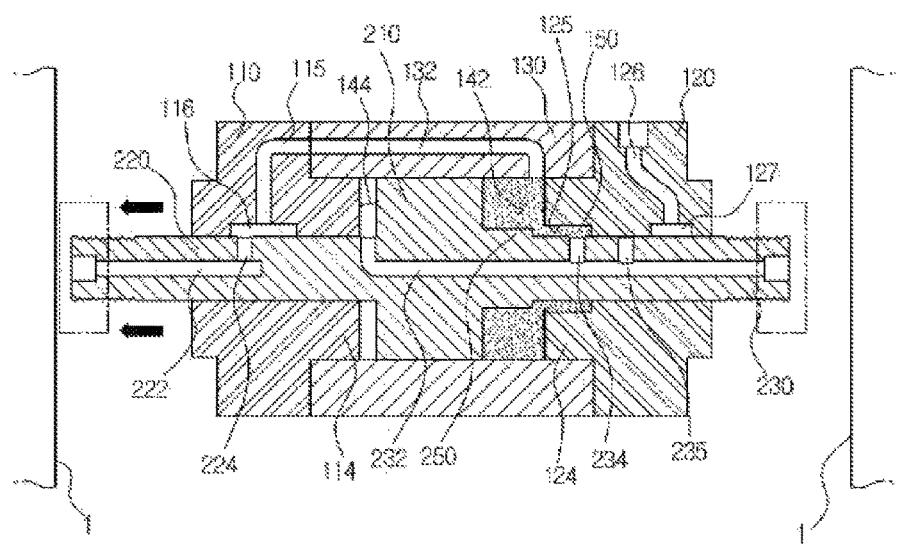

When the fluid is supplied to the first pressure-creating space 142, the internal pressure in the first pressure-creating space 142 is increased, and the increased pressure is directly applied to the fluid contact block 210 of the actuating shaft 200. Consequently, the fluid contact block 210 is pushed toward the second pressure-creating space 144, as shown in FIG. 5. As a result, the entire actuating shaft 200 is linearly moved toward the second pressure-creating space 144.

Accordingly, the second straight rod 230 of the actuating shaft 200 is inserted into the second shaft moving path 122 of the second body 120 by a predetermined distance, and the first straight bar 220 is projected outside from the first body 110 by the same distance as the distance to which the second straight rod 230 is inserted.

When an external object 1 is located near the end of the first straight rod 220, the projected first straight rod 220 strikes the external object 1, thereby causing the external object 1 to vibrate.

When the actuating shaft 200 is moved toward the second pressure-creating space 144, the insertion portion 250 is drawn out of the cross-section reduction recess 125. At this time, the first fluid discharge hole 234 in the second straight rod 230 communicates with the fluid discharge gap 150 in the first body 110 but the second fluid discharge hole 235 is deviated from the fluid discharge gap 126.

Accordingly, the fluid introduced in the first pressure-creating space 142 is introduced into the fluid recovery path 232 in the actuating shaft 200 through the fluid discharge gap 150 and the first fluid discharge hole 234, and is charged into the second pressure-creating space 144, as shown in FIG. 6.

As the second pressure-creating space 144 is filled with fluid, the internal pressure in the second pressure-creating space 144 is increased. At this point, since the zone of the second straight rod 230 that is positioned in the second pressure-creating space 144 has a larger cross-sectional area than the zone of the second straight rod 230 on which the insertion portion 250 is formed, the pressure acting on the zone of the actuating shaft 200 that is positioned in the second pressure-creating space 144 and the fluid contact block 210 is higher than the pressure created in the first pressure-creating space 142.

Figure 7:
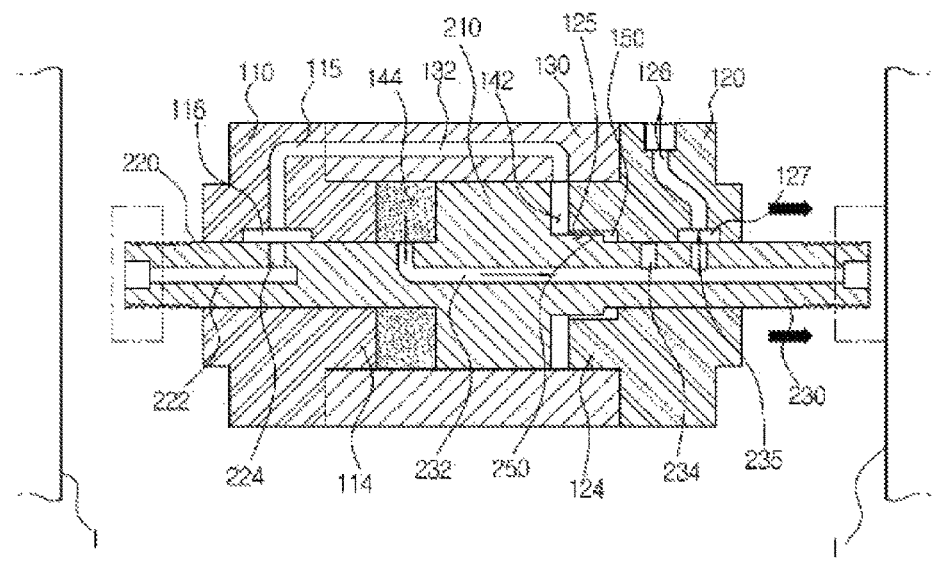

Consequently, as the pressure in the second pressure-creating space 144 is increased, the fluid contact block 210 is moved toward the first pressure-creating space 142, as shown in FIG. 7. As a result, the whole actuating shaft 200 is linearly moved toward the first pressure-creating space 142.

Accordingly, the first straight rod 220 is retracted into the first shaft moving path 112 in the first body 110 by a predetermined distance while the second straight rod 230 is pushed outward from the second body 120 by the same distance.

In other words, the actuating shaft 200 is linearly reciprocated by a single supply of fluid.

As the second straight rod 230 is pushed outward, the end of the second straight rod 230 strikes the external object 1, which is positioned near the end, thereby causing the external object 1 to vibrate.

Accordingly, if the external objects 1 are respectively positioned near the first straight rod 220 and the second straight rod 230, it is possible to apply the vibration to both the external objects via a single supply of fluid.

In addition, since the fluid supply tube is connected in the same direction as the longitudinal direction and the moving direction of the actuating shaft 200, the fluid supply tube is also moved in the same direction during the movement of the actuating shaft, unlike a conventional structure in which a fluid supply tube is connected to a housing in a direction perpendicular to the housing such that a load is thus concentrated on the connected region therebetween.

When the actuating shaft 200 is completely moved toward the first pressure-creating space 142, the first fluid discharge hole 234 is positioned between the fluid discharge gap 150 in the second body 120 and the second connection guide groove 127, and the second fluid discharge hole 235 communicates with the second connection guide groove 127.

During this procedure, the fluid in the second pressure-creating space 144 flows along the fluid recovery path 232, and is discharged to the outside through the second fluid discharge hole 235 and the fluid discharge path 126 in the second body 120.

After the fluid supplied through the fluid supply tube is introduced into the first pressure-creating space 142, the subsequent procedures are repeated, as described above, thereby causing the actuating shaft 200 to repeatedly move in a linear manner.

The generation of vibration resulting from the longitudinal reciprocating movement of the housing under the condition that the actuating shaft 200 is fixed to external objects will be described with reference to FIGS. 8 and 9.

Figure 8:
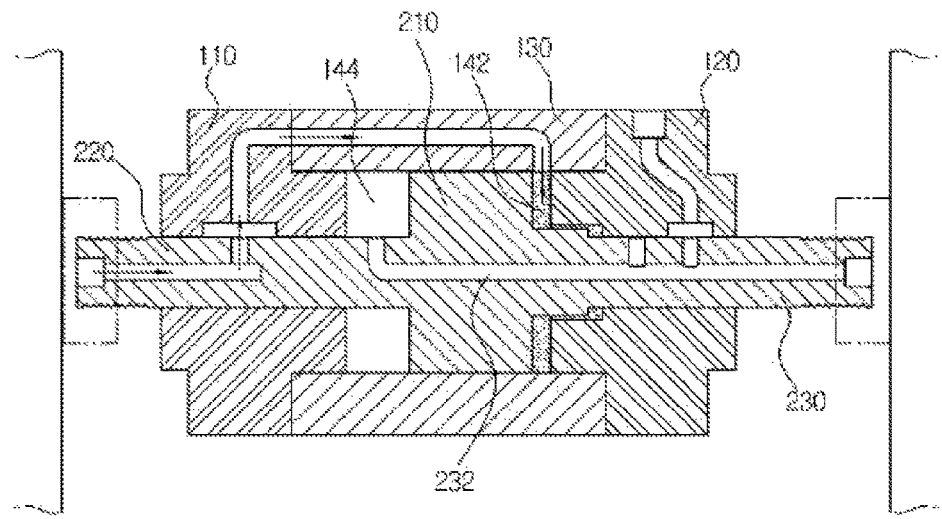
FIGS. 8 and 9 are cross-sectional views showing a procedure of generating a vibration by linear movement of the housing while the opposite ends of the actuating shaft are fixed.

As shown in FIG. 8, as fluid is introduced into the first pressure-creating space 142 through the fluid introduction path 222 and the first fluid supply path 115 as in the above embodiment, under the condition that one end or two ends of the actuating shaft 200 are fixed to external objects 1, the pressure in the first pressure-creating space 142 is increased.

However, since the end of the actuating shaft 200 is fixed to the external object, the actuating shaft 200 cannot be moved toward the second pressure-creating space 144 but the whole housing 100 is linearly moved toward the end of the second straight rod 230.

As the housing 100 is moved, the inner surface of the first body 110 collides with the fluid contact block 210, and the vibration caused by the collision is transmitted to both the end of the second straight rod 230 and the end of the first straight rod 220.

Accordingly, when the opposite ends of the actuating shaft 200 are fixed respectively to external objects, the vibration may be concurrently transmitted to both external objects by a single collision between the housing and the actuating shaft 200.

Figure 9:
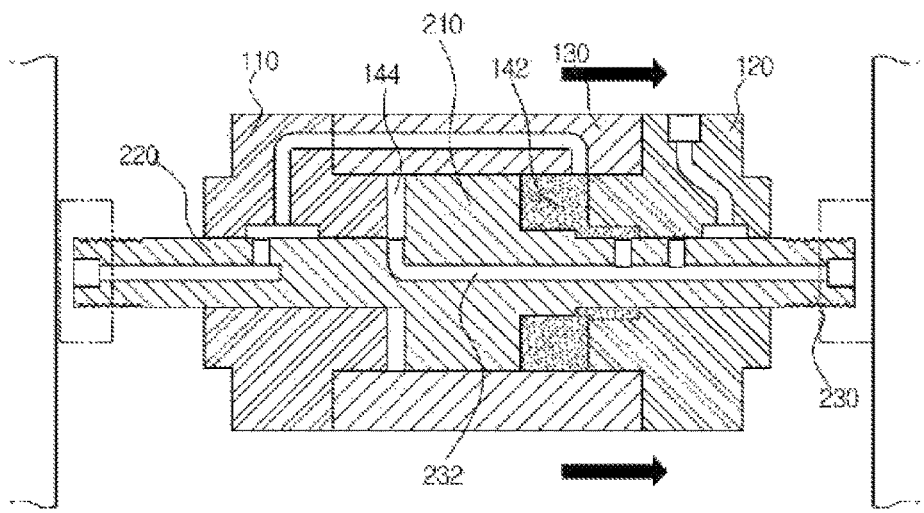

Subsequently, when the internal pressure in the second pressure-creating space 144 is increased due to the introduction of fluid into the second pressure-creating space 144 through the fluid recovery path 232, the whole housing 100 is moved toward the end of the first straight rod 220 because the actuating shaft 200 is fixed, as shown in FIG. 9. At this time, one side surface of the second body 120 collides with the fluid contact block 210, thereby generating a vibration again.

Since the actuating shaft protrudes from opposite ends of the housing 100, vibration transmission efficiency is improved compared to a conventional technology in which an actuating shaft protrudes only in one direction. In addition, since a vibration is generated under the condition that the opposite ends of the actuating shaft 200 are fixed, a phenomenon whereby the entire vibration generator droop is prevented, and the risk of breaking the connected portion between the actuating shaft and an external object is minimized, compared to the case in which only one end of an actuating shaft is fixed to an external object.

Even in the case where the whole housing 100 is longitudinally reciprocated, since the fluid supply tube is connected to the actuating shaft, there is also an advantage of preventing the risk of breakage of the connected portion of the fluid supply tube during the movement of the housing 100.

Although not shown in the drawings, if the actuating shaft 200 is longitudinally reciprocated and collides with an external object under the condition that the housing 100 is fixedly installed, the fluid supply tube may be directly connected to the first fluid supply path 115 or the second fluid supply path 132 of the housing 100, omitting the fluid introduction path.

In other words, since there is little risk of breakage of the connected portion of the fluid supply tube during the generation of vibration because the housing 100 is fixed, the risk of breakage of the connected portion of the fluid supply tube is prevented even when the fluid supply tube is directly connected to the housing 100.

Figure 10:
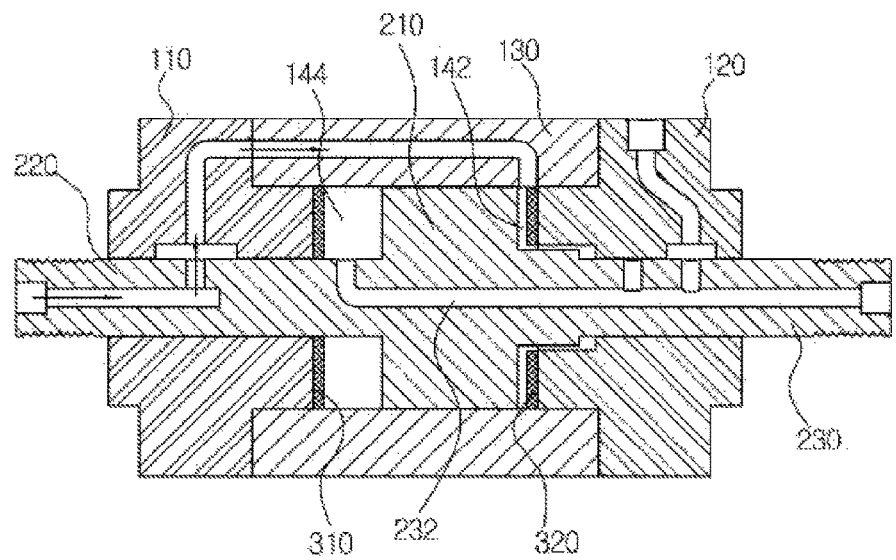
FIG. 10 is a cross-sectional view showing a modification in which first and second buffer members are provided in the pressure-creating space.
Figure 11:
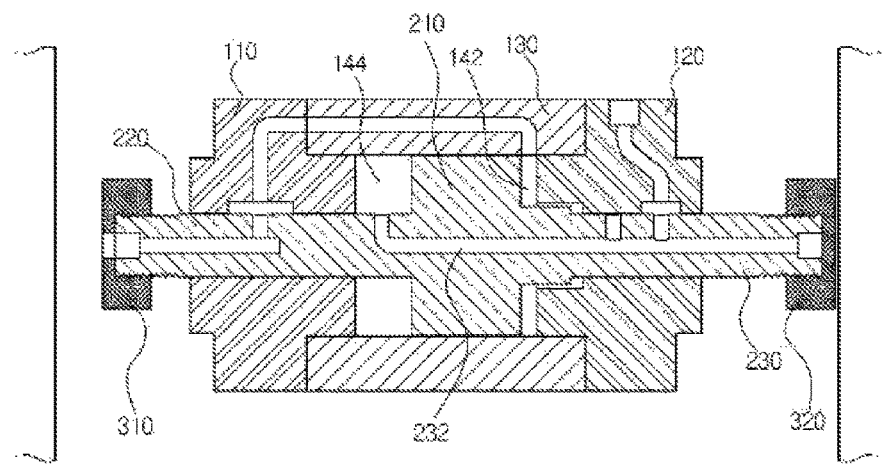
FIG. 11 is a cross-sectional view showing a modification in which first and second buffer members are provided at opposite ends of the actuating shaft.

FIGS. 10 and 11 are views showing modifications of the present invention, characterized that additional first and second buffer members 310 and 320 are provided inside or outside the housing 100 in order to minimize reduction in the service life of the actuating shaft 200 and the housing or external objects.

FIG. 10 is a view showing a modification in which the first and second buffer members 310 and 320 are provided in the housing 100. In this modification, the first buffer member 310 is made of a soft material such as rubber so as to have a ring shape, and is in close contact with the surface of the first body 110 that faces the second pressure-creating space 144 with the first straight rod 220 penetrating the center of the first buffer member 310.

The second buffer member 320 is also made of a soft material such as rubber so as to have a ring shape, and is in close contact with the surface of the second body 120 that faces the first pressure-creating space 142 with the second straight rod 230 penetrating the center of the second buffer member 320.

Consequently, when the fluid contact block 210 collides with the inner surfaces of the first and second bodies 110 and 120 during the reciprocating movement in the pressure-creating space 140, the impact of collisions is attenuated by means of the first and second buffer members 310 and 320, thereby preventing breakage of the fluid contact block 210 or the first and second bodies 110 and 120.

For reference, although the first buffer member 310 and the second buffer member 320 are illustrated in the drawing as being in close contact with the first and second bodies 110 and 120, the first and second buffer members 310 and 320 may be in close contact with the opposite surfaces of the fluid contact block 210.

FIG. 11 is a view showing a modification in which the first and second buffer members 310 and 320 are mounted on the opposite ends of the actuating shaft 200. In this modification, each of the buffer members is configured to have a block shape, and is threadedly engaged at one end thereof with the threaded section 240.

As mentioned above, the connection between the first and second buffer members 310 and 320 and the actuating shaft 200 may be implemented using any coupling structure other than the threaded structure.

Consequently, first and second buffer members 310 and 320 attenuate the collision impact generated when the actuating shaft 200 collides with an external object, thereby preventing breakage of the actuating shaft 200 or the external object.

For reference, although not shown in the drawing, the first and second buffer members 310 and 320 may also be mounted to both the inside of the housing 100 and the opposite ends of the actuating shaft 200.

The first and second buffer members 310 and 320 are not limited to any specific material, and may be made of various materials such as urethane, rubber, silicone, plastics or the like as long as it is capable of preventing breakage of the external object 1 and the housing 100 caused by collision with the housing 100 during longitudinal reciprocating movement in the housing 100.

Figure 12:
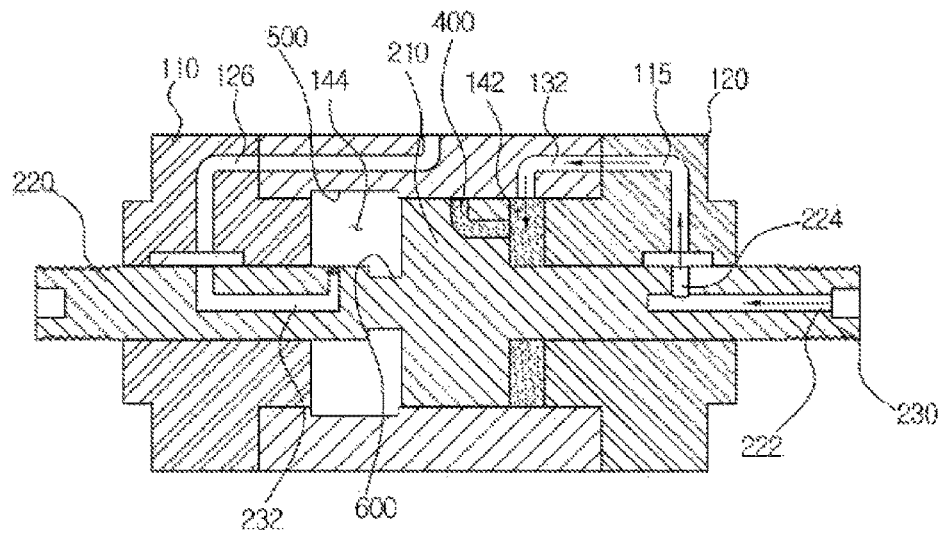
FIGS. 12 to 15 are cross-sectional views showing the operation of embodiments in which the fluid flow path in the housing is embodied differently.
Figure 13:
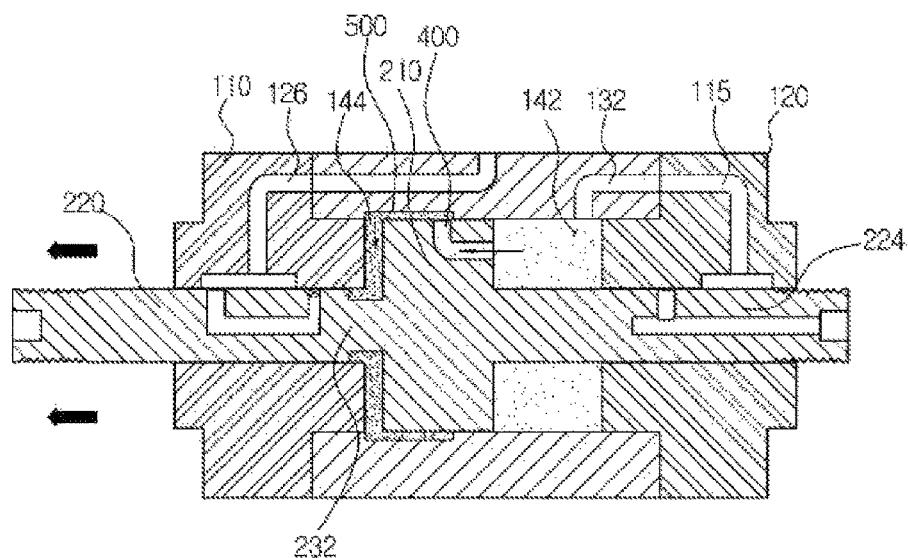
Figure 14:
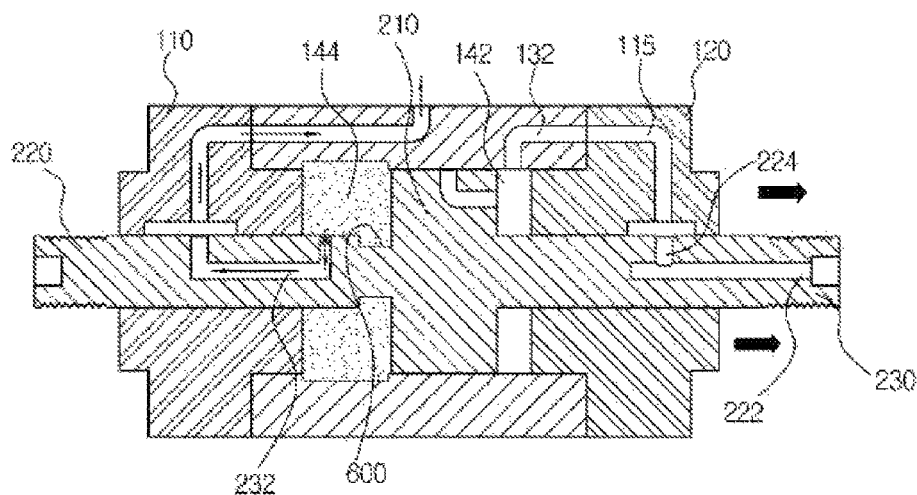

FIGS. 12 to 14 are views showing another embodiment of the present invention in which the fluid transfer path in the housing 100 is differentiated from the previous embodiment.

More specifically, this embodiment is essentially similar to the above embodiment in technical concept in that the actuating shaft 200 is moved in one direction by fluid introduced into the pressure-creating space 140 in the housing 100 through the end of the actuating shaft 200, and is then moved in the opposite direction by the difference in cross-sectional area between the first straight rod 220 and the second straight rod 230 while the fluid is discharged to the outside.

The differences between this embodiment and the above embodiment are as follows. The fluid introduction path 222 is formed in the second straight rod 230, and the fluid discharge gap 150 in the housing 100 and the insertion portion 400 of the actuating shaft 200 are omitted. A fluid transfer hole 400 is formed in the fluid contact block 210 such that one end of the fluid transfer hole 400 is formed in the surface of the fluid contact block 210 that faces the first pressure-creating space 142 and the other end of the fluid transfer hole 400 is formed in the outer surface of the fluid contact block 210.

The connecting pipe 130 has a fluid transfer groove 500 formed in the inner surface thereof, which has a predetermined depth and is positioned in a zone corresponding to the second pressure-creating space 144.

Accordingly, when the fluid contact block 210 is positioned in the zone of the second pressure-creating space 144 corresponding to the fluid transfer groove 500 while the actuating shaft 200 is moved toward the second pressure-creating space 144, the fluid transfer hole 400 formed in the fluid contact block 210 naturally communicates with the fluid transfer groove 500.

The first straight rod 220 is provided therein with the fluid recovery path 232 and the first fluid discharge hole 234. When the actuating shaft 200 is completely moved to the first pressure-creating space 142, the first fluid discharge hole 234 is positioned in the second pressure-creating space 144, whereby the second pressure-creating space 144 communicates with the fluid recovery path 232.

The first straight rod 220 has a diameter reduction groove 600, which is formed in the outer surface of the first straight rod 220 in the second pressure-creating space 144.

In this construction, fluid is introduced into the fluid introduction path 222, and is charged into the first pressure-creating space 142 through the first fluid supply path 115 and the second fluid supply path 132.

Accordingly, the pressure in the first pressure-creating space 142 is increased, and the actuating shaft 200 including the fluid contact block 210 is moved toward the second pressure-creating space 144. As a result, the first straight rod 220 is pushed outward from the housing 100, and the second straight rod 230 is retracted into the housing 100 by a predetermined distance.

At this time, the fluid charged in the first pressure-creating space 142 is introduced into the fluid transfer hole 400. When the fluid contact block 210 does not reach the fluid transfer groove 500 in the connecting pipe 210, the fluid contact block 210 is in close contact with the inner surface of the connecting pipe 210, and the other end of the fluid transfer hole 400 is thus closed, thereby maintaining the state in which the fluid transfer hole 400 is filled with the fluid.

Thereafter, when the fluid contact block 210 passes over the fluid transfer groove 500 in the connecting pipe 130, the end of the fluid transfer hole 400 that is located at the outer surface of the fluid contact block 210 communicates with the fluid transfer groove 500. Consequently, the fluid in the first pressure-creating space 142 is introduced into the second pressure-creating space 144 through the fluid transfer hole 400, and the internal pressure in the first pressure-creating space 142 becomes equal to the internal pressure in the second pressure-creating space 144 after some time.

At this time, since the second straight rod 230 is provided with the diameter reduction groove 600 in the region thereof that is located in the second pressure-creating space 144, and since the cross-sectional area of the fluid contact block 210 and the first straight rod 220 that is positioned in the second pressure-creating space 144 is larger than that of the fluid contact block 210 and the first straight rod 220 that is positioned in the first pressure-creating space 142, as described above, the actuating shaft 200 including the fluid contact block 210 is moved back toward the first pressure-creating space 142.

The returning movement of the actuating shaft 200 due to the difference in cross-sectional area is substantially identical to the above embodiment in a technical concept.

As a result, the first straight rod 220 is retracted into the housing 100 by a predetermined distance, and the second straight rod 230 is pushed outward from the housing 100 by that distance.

During the returning movement of the actuating shaft 200, the fluid in the second pressure-creating space 144 is discharged to the outside through the first fluid discharge hole 234 in the first straight rod 220, the fluid recovery path 232 and the fluid discharge path 126.

Thereafter, the fluid, which has been discharged to the outside, is introduced into the first pressure-creating space 142 so as to repeat the above procedures.

Figure 15:
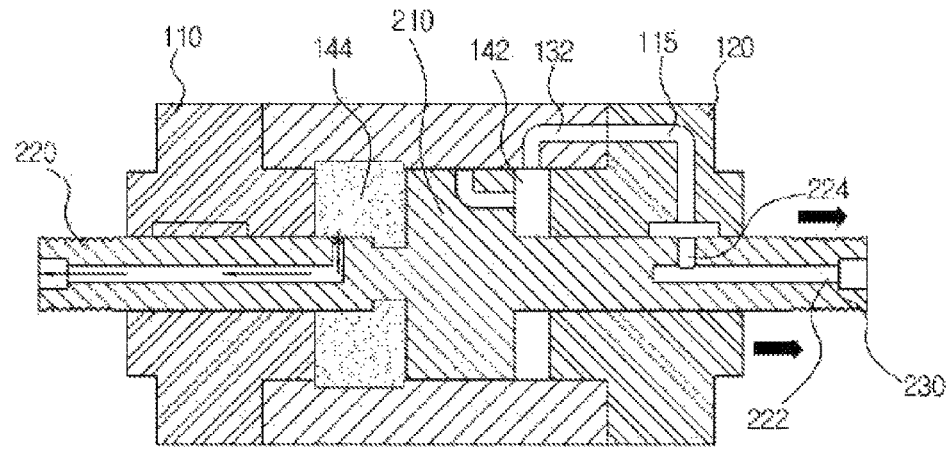

FIG. 15 is a view showing a modification of the embodiment of the present invention in which the other end of the fluid recovery path 232 opens at the end of the first straight rod 220 without forming the fluid discharge path 126 in the housing 100 such that the fluid introduced into the fluid recovery path 232 is directly discharged to the outside.

In other words, in this modification, the fluid recovery path serves as the fluid discharge path 126.

For reference, although not shown in the drawing, the embodiment shown in FIGS. 12 to 15 may also include the first buffer member 310 and the second buffer member 320.

Furthermore, although not shown in the drawing, the first straight rod 220 may be configured to have a smaller diameter than that of the second straight rod 230, omitting the diameter reduction groove so as to increase the cross-sectional area in the first pressure-creating space.

Figure 16:
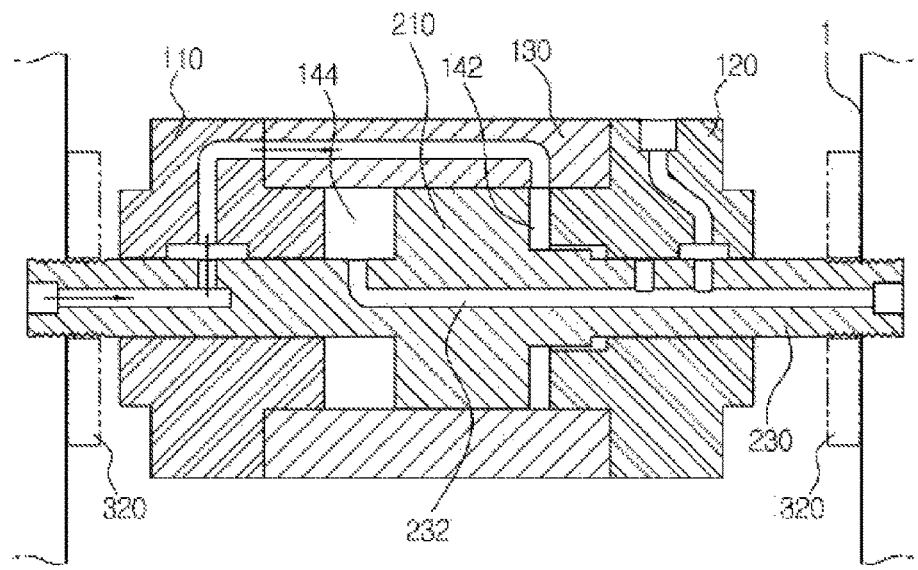
FIGS. 16 and 17 are views showing modifications of the buffer members.
Figure 17:
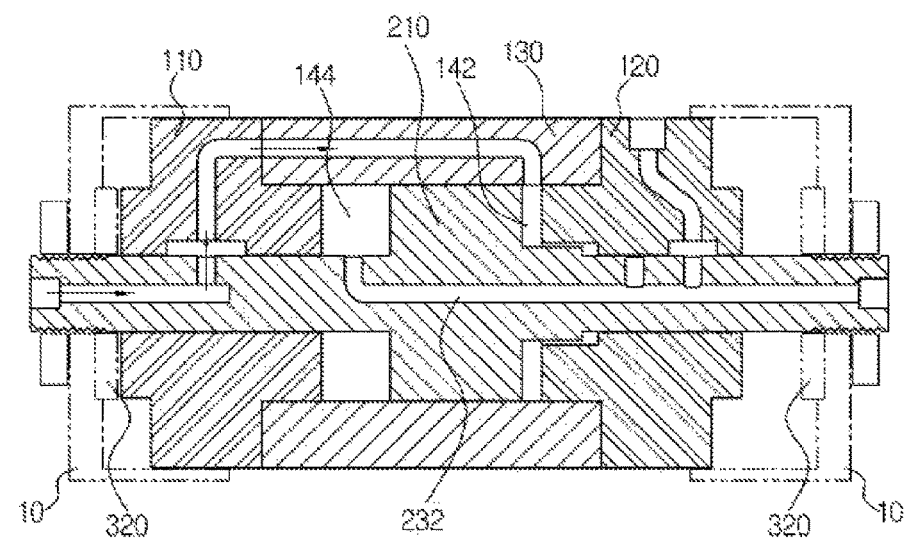

FIGS. 16 and 17 are views showing modifications of the second buffer member 320. Unlike the embodiment shown in FIG. 11 in which the second buffer member 320 is directly coupled to the threaded section 240 of the actuating shaft 200, the threaded section 240 is fixed to an external object, and the second buffer member 320 is positioned ahead of the fixed point, thereby fulfilling the buffering function by the buffer member during the reciprocating movement of the housing 100.

In this case, the second buffer member 320 is simply exposed to the outside, as shown in FIG. 16, or an additional cover 10 is provided to surround all of the circumference of the second buffer member 320, the circumference of the end of the housing 100 that faces the second buffer member 320 and the portion of the actuating shaft 200 disposed between the second buffer member 320 and the end of the housing 100, as shown in FIG. 17, so as to prevent an accident which may occur when a user's finger or a foreign object enters the gap between the housing 100 and the buffer member 320 while the housing 100 is longitudinally reciprocated.

This modification of the buffer member may be applied to any of the above embodiments regardless of the internal structure of the housing 100.

As described above, the most characteristic point of the present invention resides in the fact that vibrations are generated through the opposite ends of the actuating shaft 200, which protrude outward from the housing 100, thereby enabling improvement in vibration-generating efficiency and stable installation compared to a conventional technology.

In addition, another characteristic point of the present invention resides in the fact that, by virtue of improvement in the fluid flow path in the housing 100, two collisions between the actuating shaft 200 and the housing 100 are obtained via a single supply of fluid, thereby enabling improvement in vibration-generating efficiency compared to the conventional technology.

Furthermore, still another characteristic point of the present invention resides in the fact that, since the fluid supply tube is connected to the actuating shaft 200, the load resulting from vibrations generated by movement of the housing 100 is concentrated on the connected portion of the fluid supply tube, thereby preventing breakage of the components.

In addition, a further characteristic point of the present invention resides in the fact that not only collision impact between the actuating shaft and the housing but also collision between the actuating shaft 200 and an external object are minimized by means of the buffer members.

For reference, the structure in which the actuating shaft 200 has different diameters in the longitudinal direction may be obtained by intentionally increasing the diameter of one part of the actuating shaft 200 or decreasing the diameter of that part of the actuating shaft 200 through cutting. In this case, the diameter of one part of the actuating shaft 200 may be increased or decreased over the entire length or over only the portion of the length that is positioned in the pressure-creating space 140.

The features of the present invention, which have been described above, may be variously modified or combined with each other by those skilled in the art, and the modifications or the combinations should be construed as falling within the scope of protection of the present invention so long as they are relevant to the construction and object of the present invention which are intended to improve vibration-generating efficiency compared to a conventional technology by enabling vibrations to be alternately generated in the opposite directions of a housing from the opposite ends of an actuating shaft, which are mounted in a housing so as to protrude outward from the opposite ends of the housing.

INDUSTRIAL APPLICABILITY

The vibration generator according to the present invention is constructed such that an actuating shaft disposed in a housing is able to apply vibrations to external objects connected to the actuating shaft while being repeatedly moved in an alternating manner by fluid pressure. In particular, vibrations caused by the actuating shaft are simultaneously generated in opposite directions of the housing, thereby improving vibration-generating efficiency. Furthermore, the structure for introducing and discharging fluid and the internal flow path of the fluid are improved, thereby enabling stable installation.

The invention claimed is:
1. A vibration generator comprising:
a housing, which includes a pressure-creating space defined therein, first and second shaft moving paths communicating with opposite ends of the pressure-creating space and an outside, a fluid supply path connecting one end of the pressure-creating space to the outside, and a fluid discharge path connecting the other end of the pressure-creating path to the outside; and
an actuating shaft, which sequentially extends through the first shaft moving path, the pressure-creating space and the second shaft moving path and protrudes outward at opposite ends thereof from opposite ends of the housing, and which includes a fluid contact block which is disposed in the pressure-creating space between a point connected to the fluid supply path and a point connected to the fluid discharge path,
wherein the actuating shaft includes:
a fluid introduction path, which is longitudinally formed in one end of the actuating shaft that is located closer to the first pressure-creating space with respect to the fluid contact block, one end of the fluid introduction path being connected to the fluid supply path; and
a fluid recovery path, which is longitudinally formed therein from a point, at which the first pressure-creating space is positioned with respect to the fluid contact block, to the other end of the actuating shaft, the fluid recovery path being connected to or disconnected from the fluid discharge path in response to movement of the actuating shaft.

2. The vibration generator according to claim 1, wherein the pressure-creating space includes a first pressure-creating space positioned at one side of the fluid contact block and a second pressure-creating space positioned at an opposite side of the fluid contact block,
wherein the fluid contact block is movable between the first and second pressure-creating spaces,
wherein the fluid supply path is connected to the first pressure-creating space; and
wherein the fluid discharge path is connected to the second pressure-creating space.

3. The vibration generator according to claim 2, wherein a diameter of a zone of the actuating shaft that is positioned in the first pressure-creating space is less than that of a zone of the actuating that is positioned in the second pressure-creating space.

4. The vibration generator according to claim 1, further comprising buffer members, which are positioned between opposite ends of the fluid contact block and inner surfaces of the pressure-creating space.

5. A vibration generator comprising:
a housing, which includes a pressure-creating space defined therein, first and second shaft moving paths communicating with opposite ends of the pressure-creating space and an outside, a fluid supply path connecting one end of the pressure-creating space to the outside, and a fluid discharge path connecting the other end of the pressure-creating path to the outside;
an actuating shaft, which sequentially extends through the first shaft moving path, the pressure-creating space and the second shaft moving path and protrudes outward at opposite ends thereof from opposite ends of the housing, and which includes a fluid contact block which is disposed in the pressure-creating space between a point connected to the fluid supply path and a point connected to the fluid discharge path; and
buffer members, which are mounted on the opposite ends of the actuating shaft.

* * * * *